United States Patent
Gupta

Patent Number: 6,025,850
Date of Patent: Feb. 15, 2000

[54] OBJECT BOUNDARIES IDENTIFIED IN A RASTER IMAGE BY A USER SELECTING POSITIONS ON THE RASTER IMAGE AND THEN USING COST FUNCTIONS TO PREDICT LIKELIHOOD OF PIXELS NEAR THE POSITION BEING ON A BOUNDARY PATH

[75] Inventor: Naresh C. Gupta, Santa Clara, Calif.

[73] Assignee: Adobe Systems Incorporated, San Jose, Calif.

[21] Appl. No.: 08/829,447

[22] Filed: Mar. 28, 1997

[51] Int. Cl.[7] ............................. G06T 11/00; G09G 5/08
[52] U.S. Cl. ............................ 345/442; 345/145
[58] Field of Search .................... 345/145, 429, 345/441, 442, 343; 382/199, 311, 316; 358/533, 452

[56] References Cited

U.S. PATENT DOCUMENTS

| | | | |
|---|---|---|---|
| 5,475,507 | 12/1995 | Suzuki et al. | 358/500 |
| 5,588,100 | 12/1996 | Parker | 345/442 |
| 5,598,182 | 1/1997 | Berend et al. | 345/441 |
| 5,608,856 | 3/1997 | McInally | 345/442 |
| 5,617,491 | 4/1997 | Roth | 345/441 |
| 5,694,535 | 12/1997 | Broekhuijsen | 345/442 |
| 5,754,180 | 5/1998 | Kivolowitz et al. | 345/418 |

OTHER PUBLICATIONS

Kass et al., "Snakes: Active Contour Models", International Journal of Computer Vision, 321–331 (1988).

Geiger et al., "Dynamic Programming for Detecting, Tracking, and Matching Deformable Contours", IEEE Transactions on Pattern Analysis and Machine Intelligence, vol. 17, No. 3, 294–302 (Mar. 1995).

Williams et al., "A Fast Algorithm for Active Contours and Curvature Estimation", CVGIP: Image Understanding vol. 55, No. 1, 14–26 (Jan. 1992).

Mortensen et al., "Intelligent Scissors for Image Composition", Computer Graphics Proceedings, Annual Conference Series, 191–198 (1995).

Primary Examiner—Jeffery Brier
Assistant Examiner—Paul A. Bell
Attorney, Agent, or Firm—Fish & Richardson P.C.

[57] ABSTRACT

A computer-implemented method identifies a boundary path of an object in a displayed raster image by sampling user input to define cursor positions in the raster image and to determine tunnel width parameters corresponding to the cursor positions. The boundary path is identified by applying a cost function that evaluates pixel values of pixels the raster image within limits defined by the tunnel width parameters and determines pixels defining the boundary path.

18 Claims, 5 Drawing Sheets

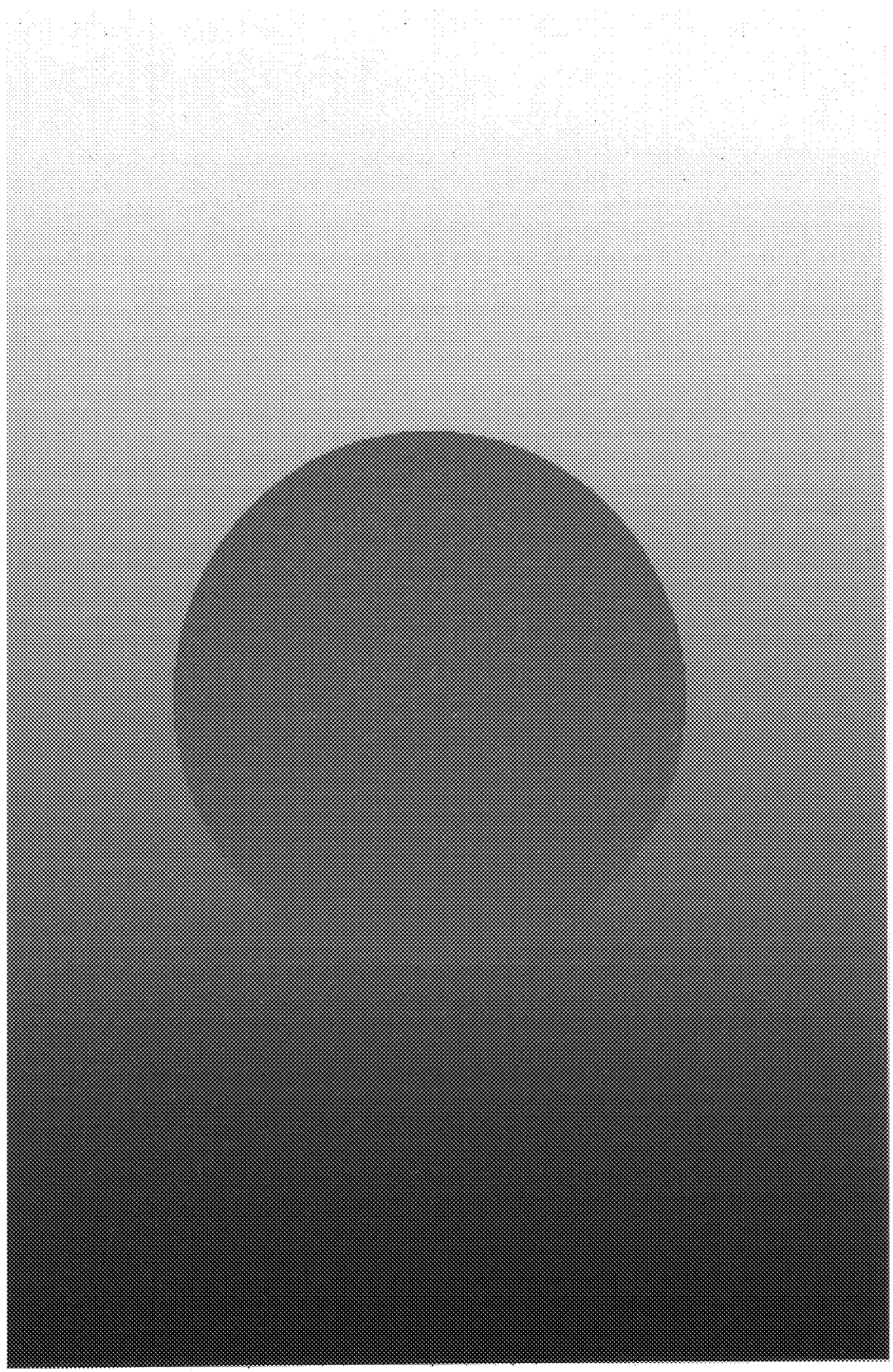
FIG._1

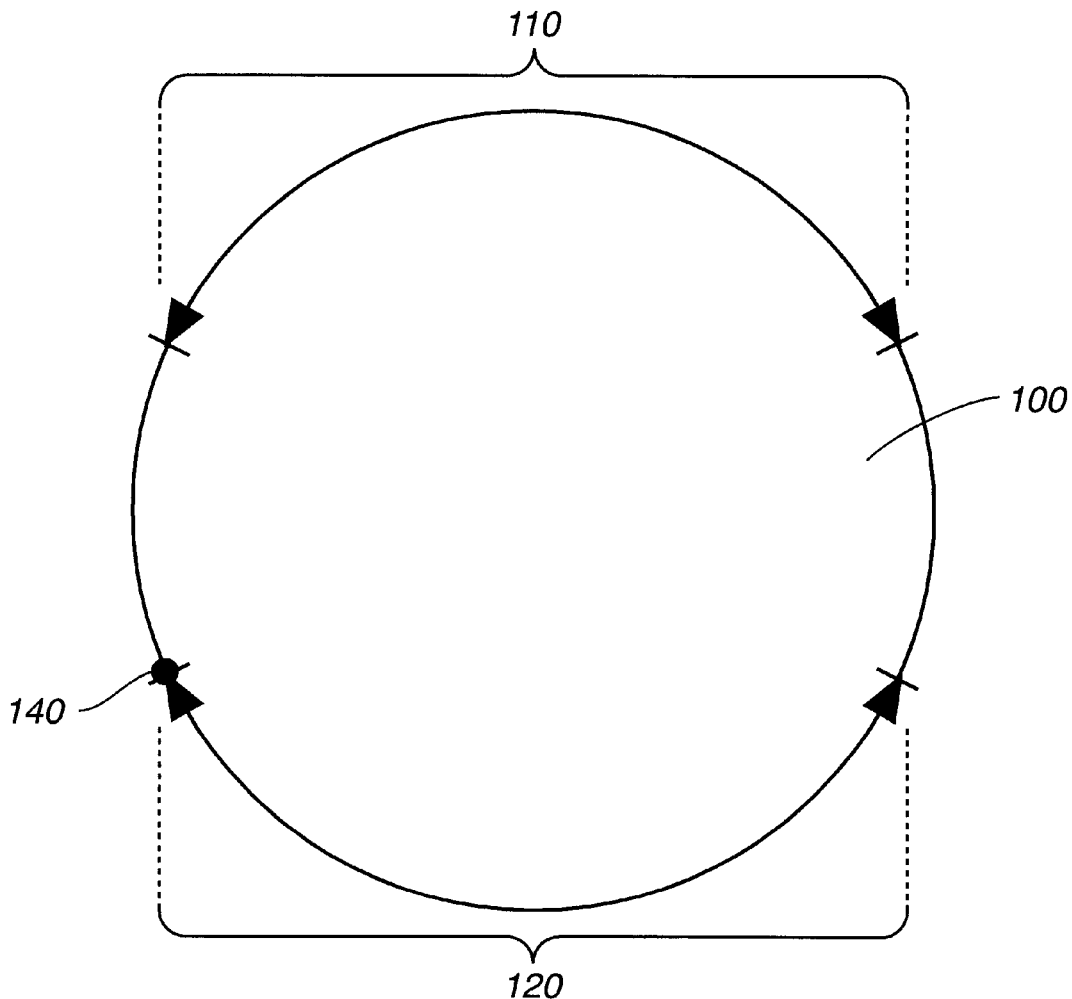
FIG._2
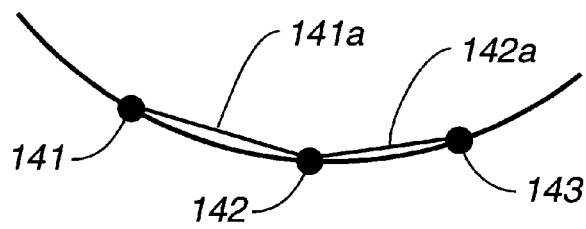
FIG._5

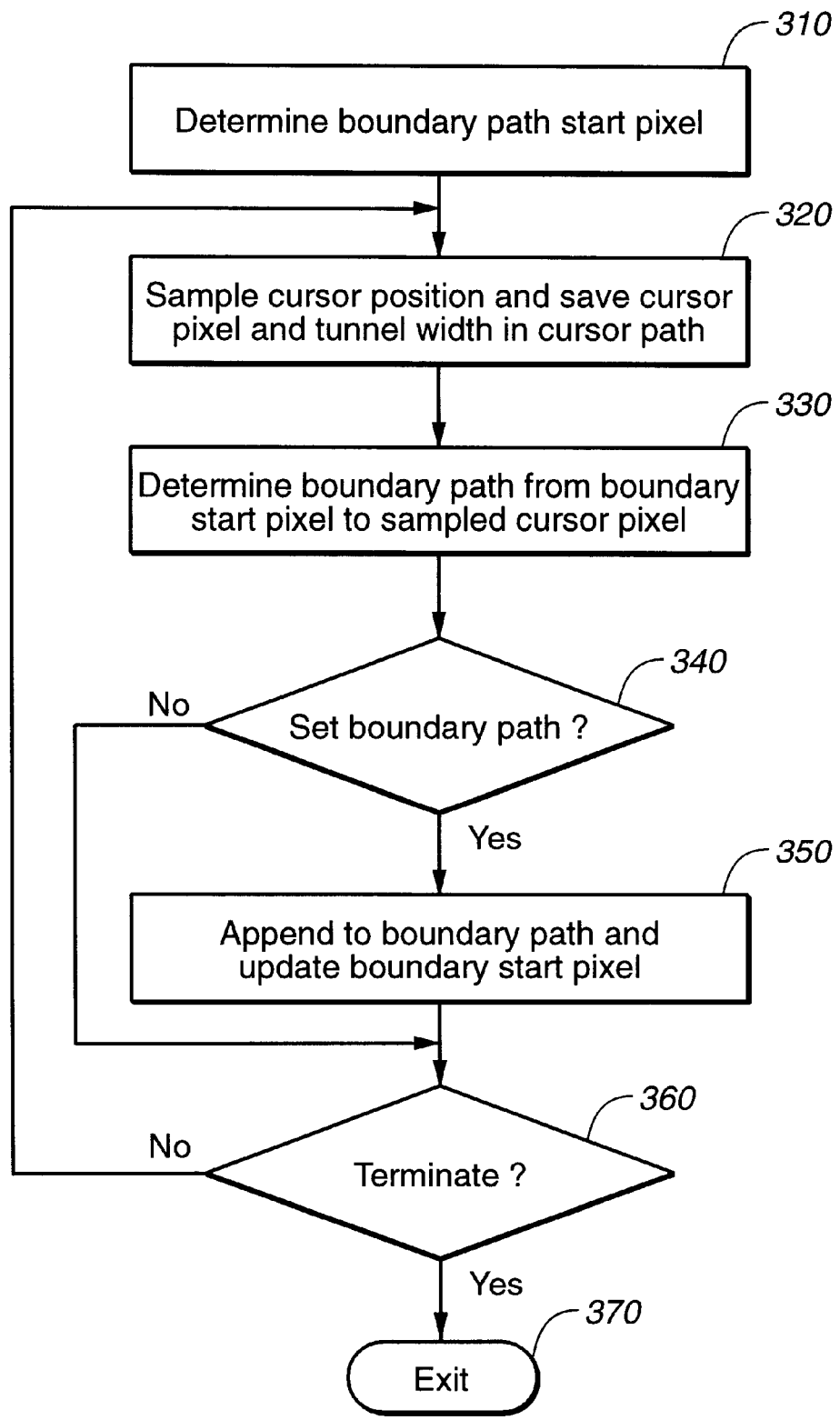
FIG._3

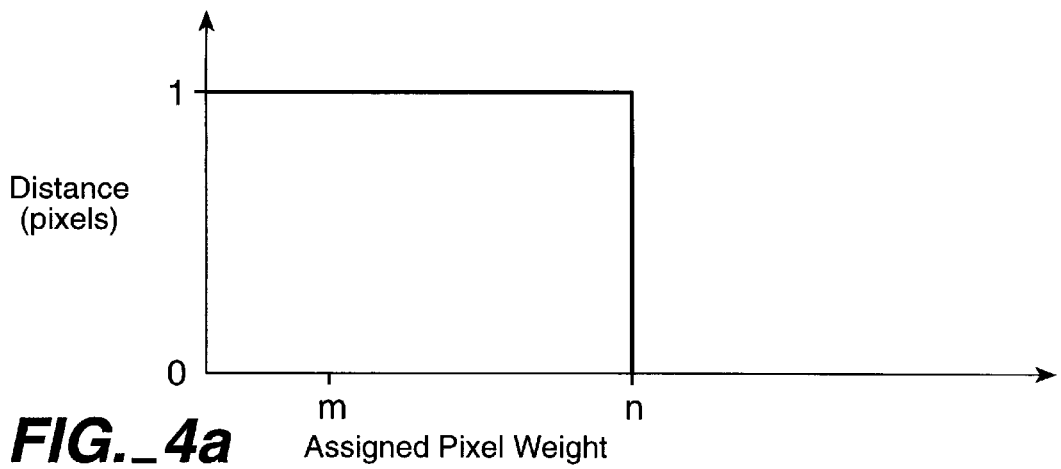
FIG._4a
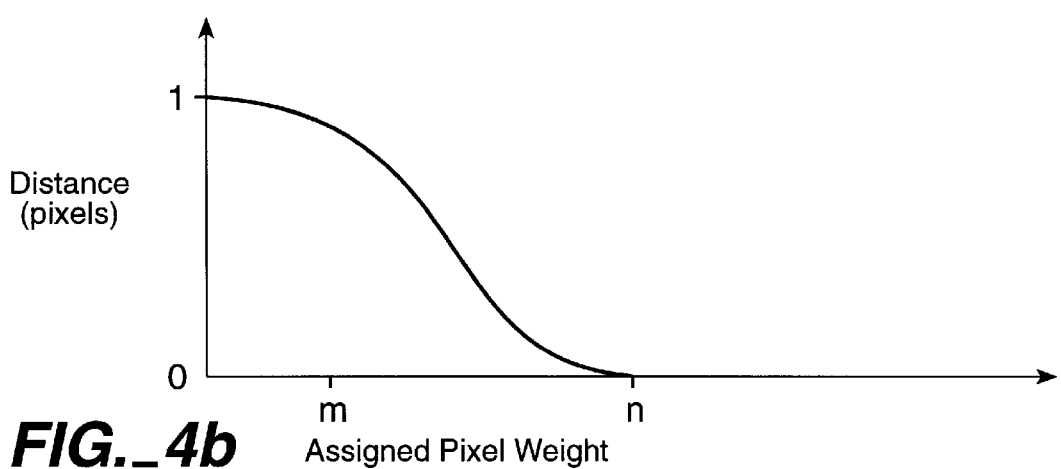
FIG._4b
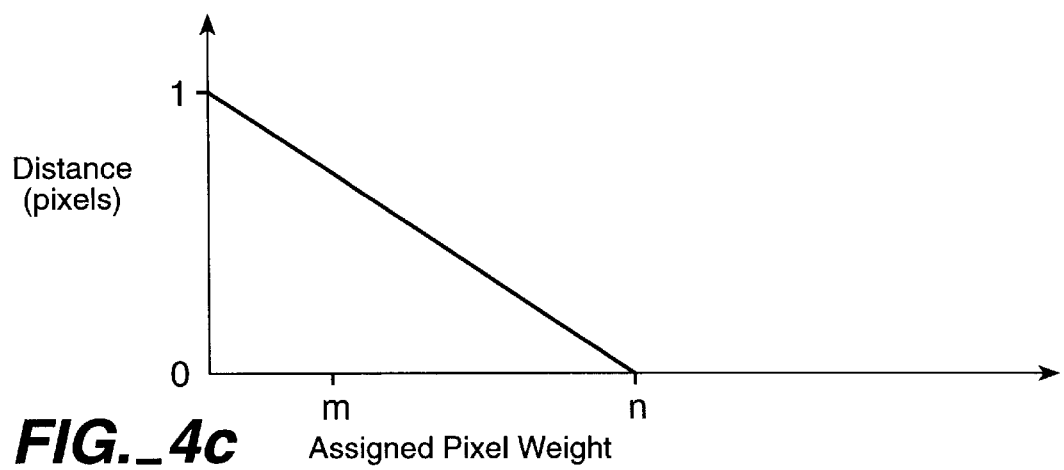
FIG._4c

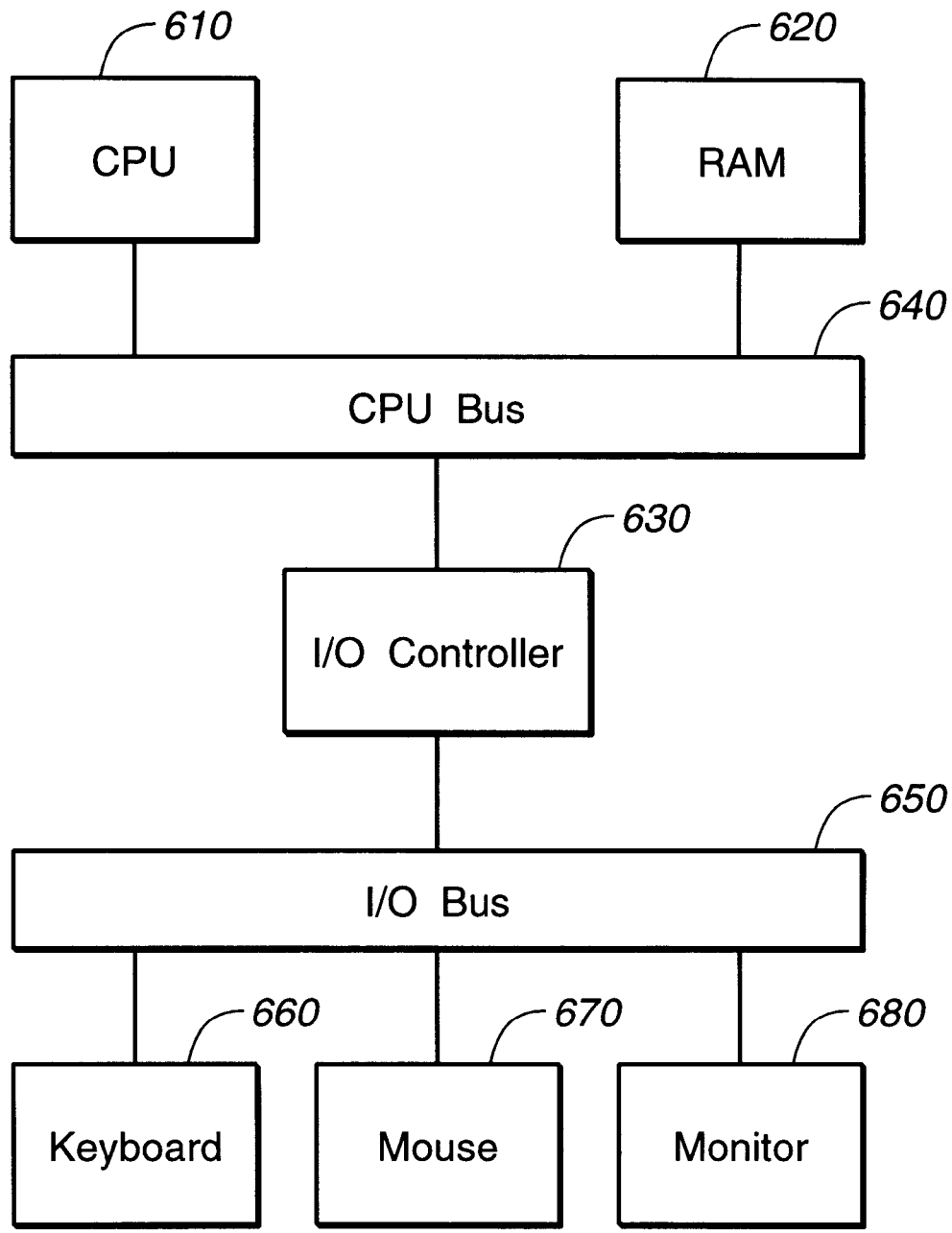
FIG._6

OBJECT BOUNDARIES IDENTIFIED IN A RASTER IMAGE BY A USER SELECTING POSITIONS ON THE RASTER IMAGE AND THEN USING COST FUNCTIONS TO PREDICT LIKELIHOOD OF PIXELS NEAR THE POSITION BEING ON A BOUNDARY PATH

BACKGROUND

This invention relates to user-assisted identification of object boundaries in a raster image.

A raster image, such as that illustrated in FIG. 1, is defined by rows and columns of pixels. In a raster image such as FIG. 1, an object boundary may be defined by identifying the pixels forming the object boundary. Once identified, the object within the boundary can be extracted and digitally manipulated for various uses in image composition.

Pixels falling on the object boundary are typically identified by a high contrast in pixel values between pixels on the boundary and pixels just outside the boundary. For example, FIG. 1 illustrates a raster image of a ball illuminated by light coming from the top. The pixels forming the boundary segment (identified in FIG. 2 as 110) of the ball (identified in FIG. 2 as 100) facing the light are easily identified because there is a high contrast between their values with the values of pixels forming the background. Pixels forming the boundary segment (identified in FIG. 2 as 120) on the bottom of the ball, however, are less easily identified because the values of pixels defining that boundary segment are similar to the values of pixels forming the surrounding background.

User input can assist in the identification of object boundaries, including boundary segments that are not readily detected.

SUMMARY

In general, in one aspect, the invention features a computer-implemented method for identifying a boundary path in a displayed raster image by sampling user input to define cursor positions in a displayed raster image, with sequential cursor positions forming a cursor path. Tunnel width parameters corresponding to one or more cursor positions are determined and a boundary path is created from pixels based on the cursor path, where each boundary pixel is within limits defined by the tunnel width parameters corresponding to cursor positions in the cursor path.

Certain implementations of the invention include one or more of the following features. The tunnel width parameters is determined based on user input.

User input is sampled periodically and boundary paths are created for more than one sampling. In this case, the method may further identify a boundary start pixel as a start point, where the boundary paths begin at the boundary start pixel. The method determines a boundary path segment of pixels from the boundary start pixel to an intermediate pixel, wherein the boundary path segment pixels are common to sequentially created boundary paths, saves the boundary path segment, sets the intermediate pixel as an updated boundary start pixel, and subsequently determines boundary paths beginning at the updated boundary start pixel.

The method displays the boundary path, and may further comprise editing the boundary path in response to user input.

The boundary path is created by defining an area of the raster image based on the limits defined by the tunnel width parameters corresponding to cursor positions in the cursor path, determining pixel values of pixels within the defined area of the raster image, applying a cost function to the pixel values of the pixels within the defined area of the raster image, and determining the boundary path based on the applied cost function. The method may further comprise determining pixel distances of pixels within the defined are of the raster image, where applying the cost function further comprises applying the cost function to the pixel distances of pixels within the defined area of the image.

Generally, in another aspect, the invention features a memory device storing computer-readable instructions for aiding a computer to perform the method described above.

In another aspect, the invention features a computer system for identifying a boundary path in a displayed raster image, including a display for displaying a raster image, a user input device for receiving user input, and a processor for sampling user input to define cursor positions in the displayed raster image, wherein sequential cursor positions form a cursor path, determining tunnel width parameters corresponding to one or more cursor positions, and creating a boundary path of pixels based on the cursor path, wherein each boundary pixel is within limits defined by the tunnel width parameters corresponding to cursor positions in the cursor path.

Advantages of the invention may include one or more of the following. Providing an adjustable tunnel width function for a boundary path provides the user with a variable degree of control in finding the boundary path. Providing real time display aids the user in creating and adjusting boundary paths interactively. Determining boundary paths interactively provides an efficient method for producing a customized boundary path. In a video comprising a series of images, creating boundary segments in one image facilitates tracking and creation of corresponding boundary segments in the series of images.

Other features and advantages of the invention will become apparent from the following description and from the claims.

BRIEF DESCRIPTION OF THE DRAWINGS

FIG. 1 illustrates a raster image to which the invention may be applied.

FIG. 2 illustrates the raster image of FIG. 1.

FIG. 3 shows a flow diagram for identifying object boundaries in a raster image in accordance with the invention.

FIGS. 4a–4c show examples of tunnel width functions.

FIG. 5 illustrates a section of the raster image of FIG. 1.

FIG. 6 illustrates a computer system suitable for use with the invention.

DETAILED DESCRIPTION

Referring to FIG. 3, user-assisted identification of an object boundary in a raster image begins by determining a boundary start pixel in response to user input (step 310). For example, using an input device such as a mouse to position a cursor in a displayed raster image, a user clicks the mouse when the cursor is positioned at or near an object boundary to be defined. In the example of FIG. 2, the cursor 140 is initially positioned close to the boundary segment 120 on the bottom face of the ball.

The boundary start pixel may be defined as the cursor pixel corresponding to the cursor position determined by user input. However, it can be difficult for a user to precisely position the cursor on a pixel on an object boundary. Accordingly, as an alternative, the cursor position can be "snapped" to a pixel within a predefined range, determined by a cost function to be likely to fall on an object boundary.

The cost function evaluates pixels within a specified range of the cursor pixel and determines a cost for each pixel reflecting the likelihood that it falls on an object boundary. The cost function takes into account both the pixel value and its distance from the cursor pixel, and the pixel having the minimum cost is selected as the boundary pixel.

Pixel values can reflect whether individual pixels have boundary properties. For example, as explained in ERIC N. MORTENSEN, ET AL., INTELLIGENT SCISSORS FOR IMAGE COMPOSITION, SIGGRAPH Computer Graphic Proceedings 191–98 (1995), incorporated by reference, factors such as the Laplacian zero-crossings and gradient magnitude and direction for pixels in a specified area reflect the contrast between values of a pixel and its neighboring pixels and give an indication of the likelihood that the pixel falls on an object boundary. Accordingly, the cost function evaluates the boundary properties of pixels within the applicable range and assigns a score to each pixel, with smaller scores indicating a stronger presence of the boundary properties.

The cost function is also a function of the pixel distance from the cursor pixel. Specifically, the cost function considers a tunnel width function, a variable function that defines the range around the cursor pixel within which the boundary pixel must lie, and assigns weights to pixels within this range based on their distance from the cursor pixel. The cost function weights the score of a pixel determined based on pixel values by the weight determined based on the tunnel width function.

The tunnel width function may be described by functions such as those illustrated in FIGS. 4a, 4b, and 4c. In these Figures, the x-axis represents the distance in pixels between a pixel and the cursor pixel and the y-axis reflects the weight assigned to a pixel at a given distance. In these examples, a smaller pixel distance is preferable to a greater pixel distance. Recalling that the boundary pixel is the pixel with the minimum cost, the weight assigned to the pixel is inversely proportional to the y value.

The tunnel width function may assign the same weight to all pixels within a given range. For example, the function of FIG. 4a allows pixels within n pixels of the cursor pixel to be considered and assigns the same weight to all such pixels. A pixel distance having a tunnel width function value of zero reflects that a very large weight is assigned, and accordingly pixels at that distance are not considered as a possible boundary pixel. For example, using the tunnel width function of FIG. 4a, pixels more than n pixels away from the cursor pixel are not considered.

Alternatively, the tunnel width function may be defined as a curve, such as those shown in FIGS. 4b and 4c. In these cases, a pixel 0 pixels away from the cursor pixel is assigned a smaller weight than, for example, a pixel m pixels away from the cursor pixel. Any pixel n or more pixels away is not considered for the boundary pixel.

As explained in greater detail below, a user may vary the scale of the tunnel width function, which would be reflected in FIGS. 4a, 4b, and 4c as varying the value of n. If n is a small value, the boundary pixel must be within a close range from the cursor pixel. As n is increased, the boundary pixel may lie within an increasing distance from the cursor pixel.

Applying a cost function to the initial cursor pixel, a boundary start pixel may be determined.

Once the boundary start pixel is set, the user manipulates the input device to move the cursor in the raster image along the boundary to be identified. The cursor position is periodically sampled, and at each sampling, a cursor pixel and a corresponding tunnel width function are determined (step 320). The series of sampled values are saved as a cursor path and are used as guides for determining a boundary path (step 330).

The boundary path is a path of pixels from the boundary start pixel to the sampled cursor pixel, and is generally determined at each sampling based on the cost function, as discussed above. The boundary path is designed to find the path of pixels in the vicinity along the user-defined cursor path that most closely defines the object boundary.

FIG. 5 shows the area of the ball 100 of FIG. 2 around boundary 120, with a boundary start pixel 141 and sampled cursor pixels 142, 143 in the cursor path. The boundary path is formed from boundary pixels determined by applying the cost function to the pixels around the area of the straight line segments 141a, 142a defined by consecutive cursor pixels. The tunnel width function corresponding to a cursor pixel such as pixel 142 is applied to each pixel along the preceding line segment 141a.

A user may wish to vary the tunnel width function at different points along the boundary to be defined. For example, if an area includes boundaries of multiple objects, the pixel values may identify a pixel on the "wrong" boundary. Thus, the user may wish to narrow the tunnel width function to restrict the boundary path to an area including only the single boundary of interest. A user may also wish to restrict the boundary path area in a situation where pixels at a boundary may not have the common properties of boundary pixels. For example, pixels of boundary segment 120 of FIG. 2 (shown in the raster image of FIG. 1) are not readily identifiable because the pixel values forming the area of the object near boundary segment 120 are similar to the pixel values forming the background. The user may therefore narrow the tunnel width function so that the boundary path is defined close to the user-defined cursor path. In still other situations, a user may wish to have complete control in determining the boundary path, without any regard to the actual pixel values.

The user can vary the tunnel width function by changing the range within which the boundary pixel must lie. For example, in FIGS. 4a, 4b, and 4c, this is represented by varying the value of n. Alternatively, the user may wish to vary the tunnel width function. For example, the user may wish to change from the constant function of FIG. 4a to the function FIG. 4b.

The tunnel width function may be provided in the menu bar of a user interface as a user-defined property of a boundary path. Alternatively, to allow a user to modify the range of the tunnel width function as the cursor path is defined, keyboard keys, such as the up and down arrow keys, may be used to increase or decrease the tunnel width function.

In general, the boundary path from the boundary start pixel to the sampled cursor pixel is determined each time the user-defined cursor position is sampled. Because each boundary path generally grows from earlier determined boundary paths, it is possible that the segment from the boundary start pixel to an intermediate pixel (somewhere between the boundary start pixel and the last sampled cursor pixel) is shared among multiple boundary paths. In this case, that path segment may be saved as a set boundary path (step 340). The specific test used for determining whether to set the boundary path may vary. For example, the text may require the identical pixels to occur in a threshold number of sequentially determined boundary paths.

Once set, the intermediate pixel is set as an updated boundary start pixel (step 350) and subsequent determinations for the boundary path will begin at the updated boundary start pixel and end at the last sampled cursor pixel. Should an additional boundary path segment be similarly identified, that additional segment can be appended to the existing set boundary path, and the process will continue with another updated boundary start pixel.

This path setting feature may be implemented using various user interfaces. For example, upon detection, the common path segment may be highlighted and the user may be prompted to indicate the portion of the highlighted segment, if any, to save.

The boundary path is interactively displayed as it is created. Thus, the user may adjust any feature of the user-defined cursor path, such as the cursor pixel or tunnel width function, by returning to an earlier sampled position in the cursor path and resuming the boundary path creation process.

The user-assisted identification of the boundary path continues until a termination condition is satisfied (step 360). For example, a user may be satisfied with the boundary path and may terminate the process by clicking the mouse. Alternatively, a termination condition may be satisfied if the current cursor pixel is determined to be identical to the original boundary start pixel, which would indicate a closed boundary.

Once a termination condition is met, the complete boundary path is saved (step 370) and can be further edited using editing tools provided in applications such as Adobe PhotoShop™, available from Adobe Systems Incorporated of San Jose, Calif.

The invention may be implemented in digital hardware or computer software, or a combination of both. Preferably, the invention is implemented in a computer program executing in a computer system. Such a computer system may include a processor, a data storage system, at least one input device, and an output device.

FIG. 6 illustrates one such computer system 600, including a CPU 610, a RAM 620, and an I/O controller 630 coupled by a CPU bus 640. The I/O controller 630 is also coupled by an I/O bus 650 to input devices such as a keyboard 660 and a mouse 670, and output devices such as a monitor 680.

Variations are within the scope of the following claims. For example, instead of using a mouse as the input devices, a pressure-sensitive pen or tablet may be used to generate the cursor position information, and the pressure applied may be used to determine the range of the tunnel width function. Alternatively, the velocity with which the user moves the cursor may be used as a factor in determining the tunnel width function, with a slower velocity reflecting a user's desire to follow the cursor movement more closely and thus narrow the tunnel width function.

The cost function may be based on various functions of pixel values and distances.

As another variation, sample cursor pixels and tunnel width functions may be determined and saved as part of the cursor path, but the boundary path may be determined only for selected cursor positions (such as every third cursor position, or once every second). Another variation uses various properties in the cost function to determine the boundary path.

What is claimed is:

1. A computer-implemented method for identifying a boundary path in a displayed raster image, comprising:

sampling user input to define cursor positions in a displayed raster image, wherein sequential cursor positions form a cursor path;

defining one or more cost functions each a measure of a likelihood that a pixel falls on the boundary path;

for each cursor position, using one of the one or more cost functions to evaluate pixels within a specified range of the cursor position to determine a cost associated with each pixel; and creating a boundary path of pixels based on the cursor path, wherein each boundary pixel corresponding to a cursor position in the cursor path has a minimum cost.

2. The method of claim 1, wherein user input is sampled periodically and boundary paths are created for more than one sampling.

3. The method of claim 1, further comprising:

identifying a boundary start pixel as a start point, wherein boundary paths begin at the boundary start pixel;

determining a boundary path segment of pixels from the boundary start pixel to an intermediate pixel, wherein the boundary path segment pixels are common to sequentially created boundary paths;

saving the boundary path segment;

setting the intermediate pixel as an updated boundary start pixel; and subsequently determining boundary paths beginning at the updated boundary start pixel.

4. The method of claim 1, further comprising displaying the boundary path.

5. The method of claim 4, further comprising editing the boundary path in response to user input.

6. The method of claim 1, wherein the step of creating a boundary path includes selecting a pixel from the pixels in the specified range having a minimum cost as a boundary pixel.

7. The method of claim 1, wherein a unique cost function is defined for each cursor position.

8. The method of claim 1 wherein the cost reflects a likelihood that a particular pixel falls on the boundary path.

9. The method of claim 1, wherein the cost is based on both the distance from a cursor position and a pixel value.

10. The method of claim 9, wherein a pixel value reflects whether an individual pixel has a boundary property.

11. The method of claim 10, wherein the boundary properties are selected from the group of Laplacian zero-crossings and gradient magnitude and direction.

12. The method of claim 9, wherein each cost function includes a tunnel width function defining a range around a cursor position within which the boundary pixel must lie.

13. The method of claim 12, wherein the tunnel width function is a variable function that assigns weights to pixels within the range based on their respective distance from the cursor position.

14. The method of claim 13, wherein the tunnel width function is determined based on user input.

15. The method of claim 12, wherein the range defines an area of the raster image based on the limits defined by the tunnel width function corresponding to a cursor position in the cursor path, and wherein the step of using a cost function further comprises:

determining pixel values of pixels within the defined area of the raster image;

applying a cost function to the pixel values of the pixels within the defined area of the raster image; and determining the boundary path based on the applied cost function.

16. The method of claim 15, further comprising determining pixel distances of pixels within the defined are of the raster image, wherein applying the cost function further comprises applying the cost function to the pixel distances of pixels within the defined area of the image.

17. A memory device storing computer-readable instructions for aiding a computer to identify a boundary path in a displayed raster image, comprising instructions for:

sampling user input to define cursor positions in a displayed raster image, wherein sequential cursor positions form a cursor path;

defining one or more cost functions each a measure of a likelihood that a pixel falls on the boundary path;

for each cursor position, using one of the one or more cost functions to evaluate pixels within a specified range of the cursor position to determine a cost associated with each pixel and creating a boundary path of pixels based on the cursor path, wherein each boundary pixel corresponding to a cursor position in the cursor path has a minimum cost.

18. A computer system for identifying a boundary path in a displayed raster image, comprising:

a display for displaying a raster image;

a user input device for receiving user input; and a processor for:

sampling user input to define cursor positions in the displayed raster image, wherein sequential cursor positions form a cursor path;

defining one or more cost functions each a measure of a likelihood that a pixel falls on the boundary path;

for each cursor position, using one of the one or more cost functions to evaluate pixels within a specified range of the cursor position to determine a cost associated with each pixel; and creating a boundary path of pixels based on the cursor path, wherein each boundary pixel corresponding to a cursor position in the cursor path has a minimum cost.

* * * * *